(12) United States Patent
Dow et al.

(10) Patent No.: US 8,438,823 B2
(45) Date of Patent: *May 14, 2013

(54) FLEXIBLE DRAPER BELT DRIVE FOR AN AGRICULTURAL HARVESTING MACHINE

(75) Inventors: Chad A. Dow, East Moline, IL (US); William P. Conrad, Evanston, IL (US); Jeffrey A. Nelson, Moline, IL (US); Benjamin M. Lovett, Colona, IL (US); Amy C. Berg, Milan, IL (US); Eric D. Taflinger, Eldridge, IA (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/613,665

(22) Filed: Sep. 13, 2012

(65) Prior Publication Data
US 2013/0008142 A1 Jan. 10, 2013

Related U.S. Application Data

(63) Continuation of application No. 12/858,184, filed on Aug. 17, 2010, now Pat. No. 8,281,561.

(51) Int. Cl.
*A01D 43/00* (2006.01)

(52) U.S. Cl.
USPC .................. 56/181; 56/14.5; 56/192

(58) Field of Classification Search ........... 56/181, 56/185, 192, 14.5, 15.8, 208
See application file for complete search history.

(56) References Cited

U.S. PATENT DOCUMENTS

| | | | |
|---|---|---|---|
| 1,792,691 A * | 2/1931 | Harris et al. | 56/181 |
| 5,471,289 A | 11/1995 | Satoh et al. | |
| 6,202,397 B1 * | 3/2001 | Watts et al. | 56/208 |
| 7,600,364 B2 | 10/2009 | Lovett et al. | |
| 7,640,720 B1 | 1/2010 | Lovett et al. | |
| 7,788,891 B2 | 9/2010 | Puryk et al. | |
| 8,065,865 B1 | 11/2011 | Dow et al. | |

* cited by examiner

*Primary Examiner* — Alicia Torres
(74) *Attorney, Agent, or Firm* — Taylor IP, P.C.

(57) ABSTRACT

An agricultural harvesting machine including a flexible cutterbar and associated draper belts for carrying cut agricultural material to a center location. The belts are guided by a drive rollers and idler rollers. The idler roller for each belt is pivotable about an axis generally at 90 degrees to the axis of the belt and the drive roller for each belt is translatable axially to minimize diagonal stresses caused by flexing of the elongated endless belt.

9 Claims, 4 Drawing Sheets

FLEXIBLE DRAPER BELT DRIVE FOR AN AGRICULTURAL HARVESTING MACHINE

CROSS REFERENCE TO RELATED APPLICATIONS

This is a continuation of U.S. patent application Ser. No. 12/858,184, entitled "FLEXIBLE DRAPER BELT DRIVE FOR AN AGRICULTURAL HARVESTING MACHINE", filed Aug. 17, 2010 now U.S. Pat. No. 8,281,561, which is incorporated herein by reference.

FIELD OF THE INVENTION

The present invention relates to agricultural harvesting machines, such as combines, and, more particularly to agricultural harvesting machines including a cutting platform with a belt conveyor.

BACKGROUND OF THE INVENTION

An agricultural harvesting machine such as a combine includes a head and a feeder housing which remove the crop material from the field, gather the crop material and transport the crop material to a separator. In the case of thinner stemmed crops such as soybeans, wheat, etc. which may be cut with a sickle bar carrying a plurality of knives, the head may also be known as a cutting platform. The separator removes the grain crop material from the non-grain crop material. The grain is cleaned and deposited in a grain tank. When the grain tank becomes full, an unloading auger which is positioned alongside the combine during harvesting is moved to the unloading position in which the auger extends approximately perpendicular to the longitudinal axis of the combine. The combine drives alongside a vehicle into which the grain is to be unloaded, such as a semi-trailer, and the unloading auger is actuated to discharge the grain into the vehicle.

A cutting platform may generally be of two types. One type typically has a sheet metal floor with a dual feed auger near the rear of the cutting platform for feeding the crop material longitudinally to the feeder housing. A cutting platform of this type with auger feed is relatively common.

Another type of cutting platform, also known as a draper platform, utilizes a flat, wide belt, referred to as a draper or draper belt to convey crop material. The arrangement and number of belts vary among platforms. One style of draper platform has two or more side belts that convey crop material longitudinally, to the center of the platform, where a center feed belt moves the crop material laterally into the feeder housing. Each belt is wrapped around a pair of rollers, one being a drive roller and the other being an idler roller. An example of this type draper arrangement is disclosed in U.S. Pat. No. 6,202,397, which is assigned to the assignee of the present invention.

An advantage of a draper platform is that larger amounts of crop material can be transported without plugging, etc. For example, with wide platforms approaching 40 feet or even larger, the amount of crop material transported to the feeder housing can be substantial. With an auger feed platform, the crop material may bind between the auger and the back wall of the platform. In contrast, with a draper platform, the crop material is carried on top of the belt with less chance for plugging.

Advanced draper platforms provide a flexible cutting platform that follows the undulations of the field to more effectively collect crop material. The more effective arrangement for a flexible cutterbar assembly is to have a series of pivotally connected float arms where the pivot point of the float arms is as close to the surface of the field as practical. This feature allows greatly reduced draft loads when the agricultural harvester is traversing a field. In addition, it more effectively collects crop material that is close to the ground. While providing superior harvesting, this arrangement provides additional loads on the draper belt that is used to carry the crop material to a center section for processing. This is because the pivot point of the float arm, which journals the rollers for the belt, is not in line with the longitudinal rotational axis of the drive and idler rollers. As a result, the flexing of the rollers during movement through a field causes diagonal stresses on the rollers, which can lead to misalignment.

What is needed in the art, therefore, is an arrangement that minimizes the stress loading on a draper belt used in a flexible cutterbar assembly.

SUMMARY OF THE INVENTION

The invention, in one form, is a flexible draper belt assembly for an agricultural harvesting machine movable in a given direction in which the assembly has at least one endless elongated belt positioned generally laterally with respect to the direction of movement of the agricultural machine. The endless belt extends over an idler roller and a drive roller and one of the rollers is translatable along its rotational axis to alleviate diagonal stresses on the endless elongated belt.

In another form, the invention includes a cutting platform for use with an agricultural harvesting machine having at least one platform section including a frame and a plurality of float arms pivotally coupled with the frame. An endless belt is carried by the plurality of float arms and a cutterbar assembly is also carried by the plurality of float arms. The endless belt and cutterbar assembly are movable in a localized manner across the cutting platform in upwards and downwards directions. The endless belt extends over an idler roller and a drive roller carried by float arms and one of the idler and drive roller is translatable along its axis to alleviate diagonal stresses on the endless belt.

In yet another form, the invention is an agricultural harvesting machine including a feeder housing, a cutting platform attached to the feeder housing with the cutting platform including at least one platform section having a frame. A plurality of float arms are pivotally coupled with the frame and an endless belt is carried by the plurality of float arms, as well as a cutterbar assembly. The cutterbar assembly is movable in a localized manner across the cutting platform in upwards and downwards directions. The endless belt is positioned over idler and driver rollers and one of the idler and drive roller are movable in an axial direction to alleviate diagonal stresses on the belt.

DETAILED DESCRIPTION OF THE INVENTION

Figure 1:
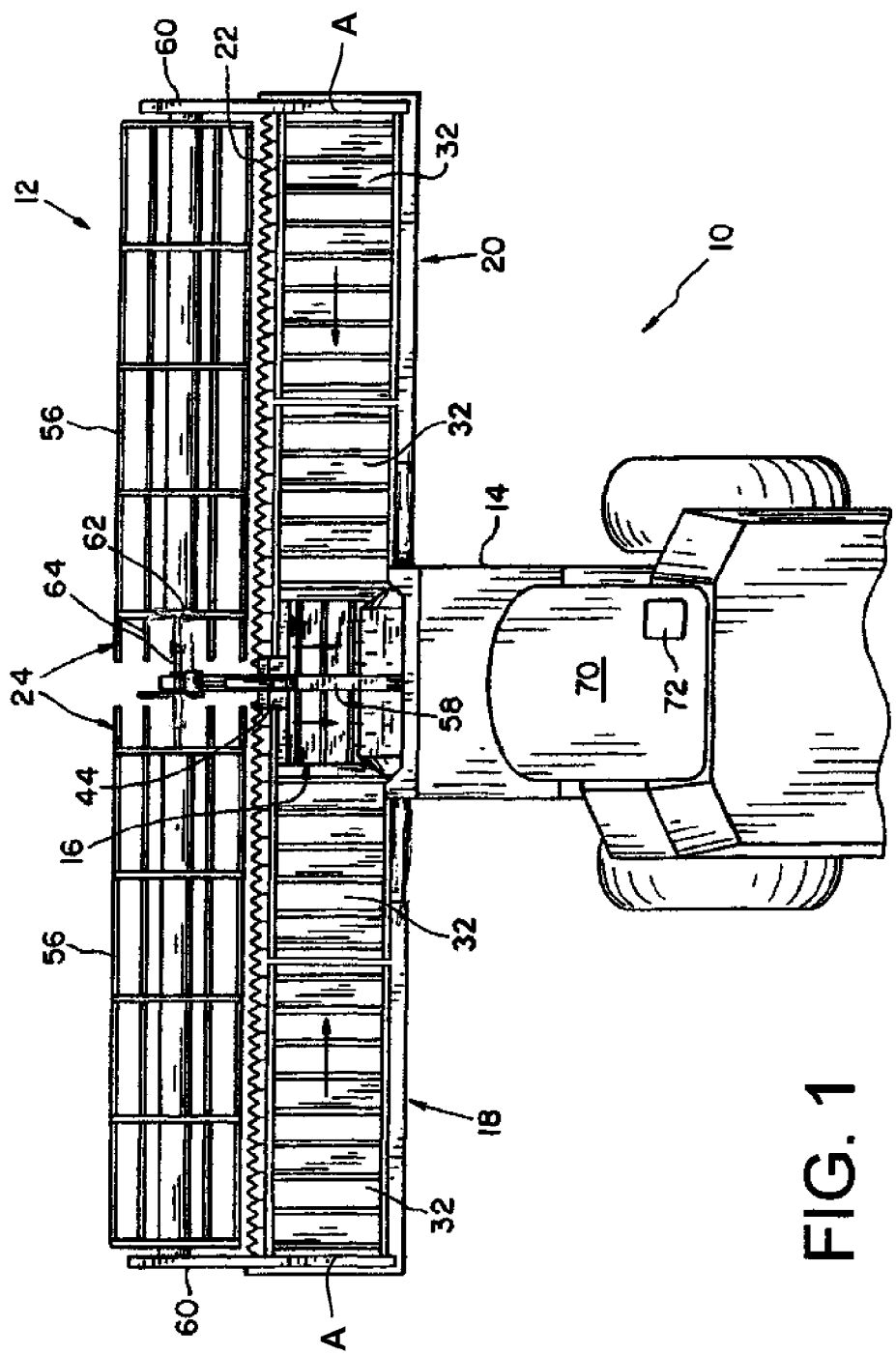
FIG. 1 is a fragmentary, top view of an agricultural combine including a cutting platform embodying the present invention.
Figure 2:
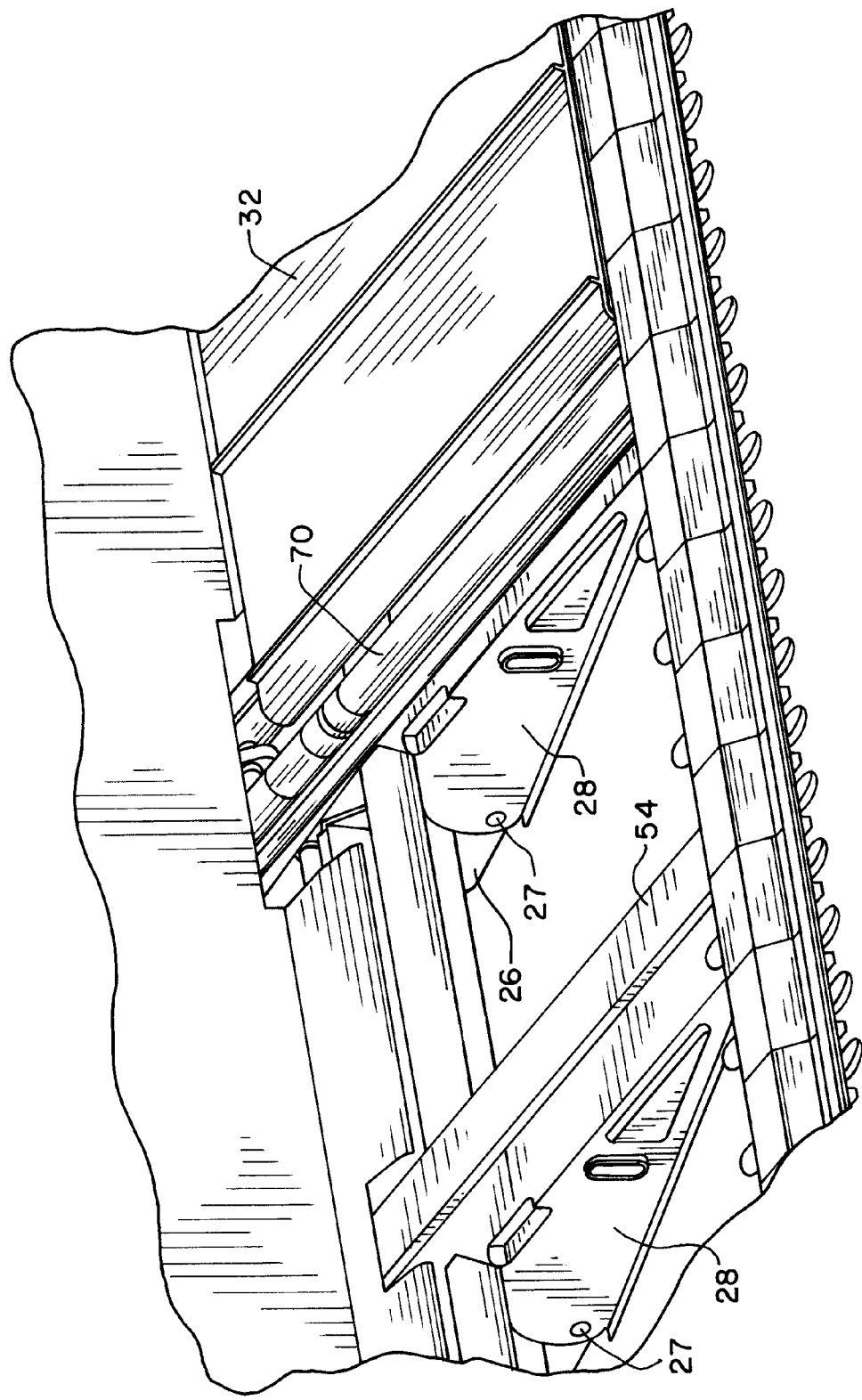
FIG. 2 is a fragmentary, perspective view of the agricultural combine of FIG. 1.
Figure 3:
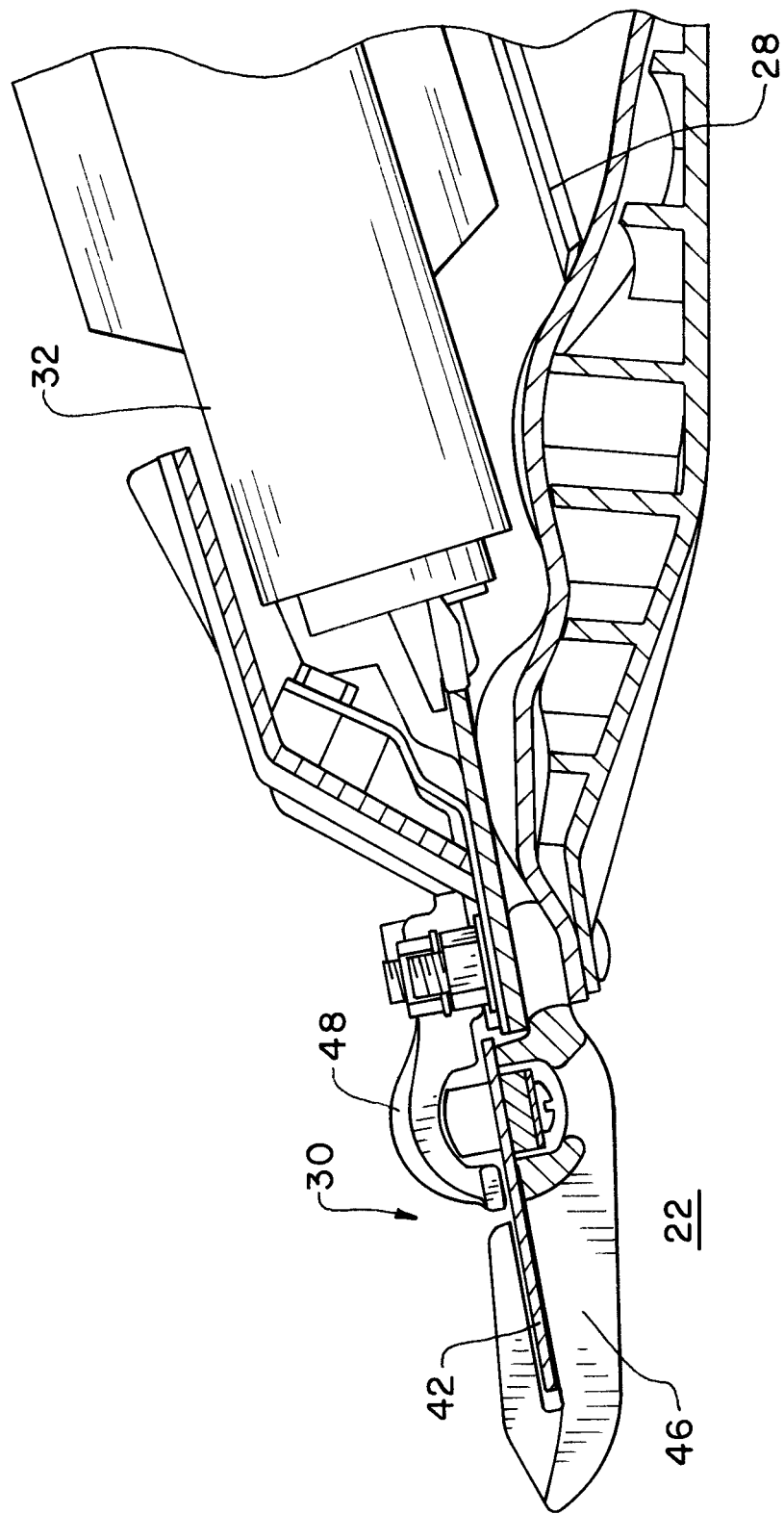
FIG. 3 is a fragmentary, cross section view of the leading edge of the cutting platform shown in FIGS. 1 and 2.

Referring now to the drawings, and, more particularly to FIGS. 1, 2, and 3, there is shown an agricultural harvesting machine in the form of a combine 10 including an embodiment of a cutting platform 12 of the present invention. Combine 10 includes a feeder housing 14 which is detachably coupled with cutting platform 12. Feeder housing 14 receives the crop material from cutting platform 12, both grain and non-grain crop material, and transports the crop material to a separator within combine 10 in known manner (not shown). The grain crop material is separated from the non-grain crop material, cleaned and transported to a grain tank. The non-grain crop material is transported to a chopper, blower, etc. in known manner and distributed back to the field.

Cutting platform 12 generally includes a plurality of platform sections 16, 18 and 20, a cutterbar assembly 22 and a reel assembly 24. Each platform section 16, 18 and 20 generally includes a frame 26, a plurality of float arms 28 coupled with a respective frame 26 at pivot points 27, a cutterbar 30 carried by the outboard ends of respective float arms 28, a plurality of endless belts 32, and a plurality of belt guides 54.

As specifically shown in FIG. 3, cutterbar assembly 22 includes cutterbars 30 carried at the outboard ends of float arms 28 (i.e., at the leading edge of a platform section 16, 18 or 20). Each cutterbar 30 includes a plurality of knives 42 carried by a bar (not specifically shown). The bar is formed from a metal which is flexible to an extent allowing a desired degree of flexure across the width of cutting platform 12. In the embodiment shown, a majority of each cutterbar 30 is carried by a respective first platform section 18 or second platform section 20, with a lesser extent at the adjacent inboard ends of each cutterbar 30 being carried by center platform section 16.

A plurality of knife guards 46 are positioned in opposition to knives 42 for providing opposing surfaces for cutting the crop material with knives 42. A plurality of keepers 48 spaced along cutterbars 30 have a distal end above cutterbars 30 for maintaining cutterbars 30 in place during reciprocating movement.

Float arms 28 are pivoted at their connection locations 27 with a respective frame 26. A float cylinder (not shown) coupled between a respective frame 26 and float arm 28 may be used for raising or lowering the outboard end of float arm(s) 28 at the leading edge of cutting platform 12. Each float cylinder may also be placed in a "float" position allowing the connected float arm 28 to generally follow the ground contour during operation. More particularly, each float cylinder is fluidly connected with an accumulator (also not shown) carried by a platform section 16, 18 or 20. An accumulator (not shown) allows fluid to flow to and from attached float cylinders such that no pressure build-up occurs. In this manner, the pistons associated with each float cylinder are free to move back and forth longitudinally, thereby allowing float arms 28 to follow the ground contour. When not in a float mode, float cylinders can be actuated to move float arms 28 in an upward or downward direction. In the embodiment shown, each float cylinder may be a hydraulic cylinder, but could possibly be configured as a gas cylinder for a particular application.

Each float arm 28 is also associated with a respective guide 54. The plurality of guides 54 for each platform section 16, 18 and 20 carry and are positioned within the loops of a plurality of endless belts 32 described in detail below.

Depending upon the width, reel assembly 24 may include two reels 56, center reel support arm 58 and a pair of outer reel support arms 60. Outer reel support arms 60 are pivotally coupled at one end thereof with an outboard end of a respective first platform section 18 or second platform section 20. Outer reel support arms 60 rotationally carry a respective reel 56 at an opposite end thereof. Each outer reel support arm 60 may be selectively moved up and down using a hydraulic cylinder, and the pair of hydraulic cylinders are typically coupled in parallel so that they move together upon actuation.

Center reel support arm 58 is pivotally coupled at one end thereof with center platform section 16 above the opening leading to feeder housing 14. Center reel support arm 58 rotationally carries an inboard end of each reel 56 at an opposite end thereof. A hydraulic motor 62 or other suitable mechanical drive rotationally drives each reel 56. More particularly, hydraulic motor 62 drives a common drive shaft 64 through a chain and sprocket or other suitable arrangement (not shown). The rotational speed of reels 56 can be adjusted by an operator by adjusting the rotational speed of hydraulic motor 62. Depending upon the width of platform 12, only one reel may be used. Center reel support arm 58 may be selectively moved up and down using a hydraulic cylinder (not shown).

Figure 4:
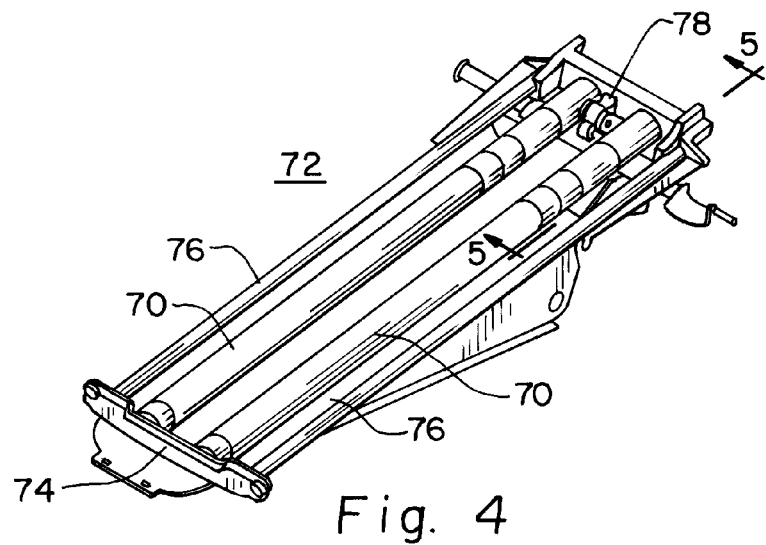
FIG. 4 is a perspective view of driver rollers for a draper platform shown in FIGS. 1-3.
Figure 5:
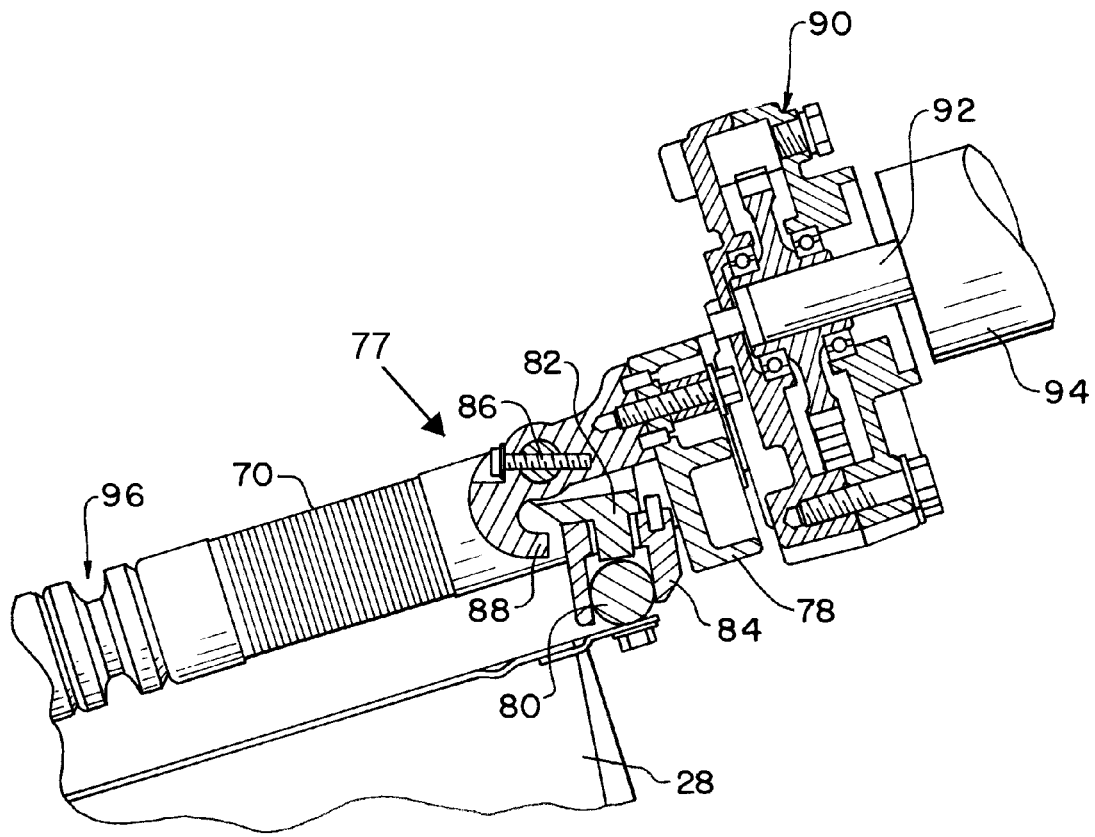
FIG. 5 is fragmentary, sectional view of the mounting for the drive rollers shown in FIG. 4.

Referring to FIGS. 4 and 5, the endless belts 32 extend between drive rollers 70 and idler rollers (not shown). The idler rollers are remote from the drive rollers and, together with the drive rollers 70, provide the function of journals about which the belt 32 extends for rotation to deliver crop inward towards the center of the work machine. The rollers additionally position the belt 32 axially so that it cooperates with the associated components of the cutterbar assembly 22. FIG. 2 shows a portion of the belt 32 wrapped around a drive roller 70. The idler rollers are positioned at the opposite end of the respective belts and, in the illustrated embodiment, provide rotation about an axis for movement of the draper belt 32 but, in addition, have the ability to pivot through a limited arc about an axis A extending out of the plane of FIG. 1 that is generally at 90 degrees to the general plane of each draper belt 32. The idler rollers for the outermost end of the cutting platform additionally provide a tensioning function for both belts on the respective platform sections in a known manner. As herein shown, the agricultural harvesting machine 10 has a total of four laterally extending belts 32, each of which has a corresponding drive roller 70 and idler roller. It should be apparent, however, to those skilled in the art that there may be more or less belts and still function in accordance with the invention.

As stated previously, the cutterbar assembly 22 has the ability to move in a localized up and down fashion to closely follow the contour of the field being harvested. Because the pivot 27 is significantly lower than rotational axis of the rollers 70 to improve draft loads, this movement causes diagonal stresses in the endless belt 32.

In accordance with the present invention, the drive rollers 70 are translatable in a fore and aft direction to minimize, if not eliminate, stresses occurring because of flexing of the cutterbar assembly 22. The drive rollers 70 are journalled within a carriage 72, having a forward plate 74, connecting rods 76, and a rear housing 78. The drive rollers 70 are appropriately journalled at plate 74 and at housing 78. As shown particularly in FIG. 5, housing 78 is connected to a float arm 28 at a pivot connection generally indicated by reference character 77 including a pin 80, secured to the proximal end of float arm 28 and a slide casting 84 embracing the pin 80. The slide casting 84 is pivotally connected to the housing 78 through a yoke 82 at a pin 86 such that movement fore and aft along the axis of drive roller 70 is permitted by the pivotal connections at pins 86 and 80. In addition, sideways movement of the carriage 72 is permitted along pin 80 to aid in the tensioning of the belts 32. Furthermore the yoke 82 also permits limited pivoting motion about an axis that is generally transverse to the plane of the belts 32.

The rearward movement is limited by a stop 88 that defines the rearmost axial displacement of the housing 78 and, thus, the roller 70. The forward end of the carriage 72 in the form of the plate 74 slides on a bar associated with the cutterbar assembly 22 and the stop 88 prevents displacement to the extent that the plate 74 would not be supported by the plate associated with the cutterbar. In addition, forward movement is limited by housing 78 abutting slide casting 84.

As illustrated, a pair of drive rollers 70 are in a common carriage 72 and both connect to housing 78. As particularly shown in FIG. 5, housing 78 connects to a gearbox 90 that drives both pairs of rollers 70 in the common direction to cause crop material to flow towards the center of the work machine. Gearbox 90 has a single input 92, which receives a rotary input from a hydraulic motor 94 shown schematically. Thus, the hydraulic motor 94 drives the rollers 70 to move crop inward toward the center of the work machine.

Rollers 70 have a groove 96 that receives a corresponding rib on the inner facing side of belt 32 so as to position it axially.

In operation, the harvesting machine 10 traverses the field and the float arms 28 move up or down as-needed to closely follow the terrain. In the configuration shown, the pivot for the float arms 28 is below the axis of rotation of the drive and idler rollers. This causes flexure and diagonal stresses in the belts 32. By enabling the drive rollers 70 to translate axially, the diagonal stresses on the belt are alleviated and the possibility of misalignment of the belt is substantially minimized.

The pairing of the drive rollers 70 enables a more efficient utilization of the rotary power source, whether it be in hydraulic form, as illustrated, or another. The pivoting connection enabling the translation of the drive rollers provides a robust and effective system that is relatively insensitive to debris and other operational conditions that would prevent movement of the drive rollers 70.

Having described the preferred embodiment, it will become apparent that various modifications can be made without departing from the scope of the invention as defined in the accompanying claims.

The invention claimed is:

1. A flexible draper belt assembly for an agricultural harvesting machine movable in a given direction, said assembly comprising:
   at least one endless elongated belt positioned generally laterally with respect to the direction of movement of said agricultural machine;
   an idler roller and a drive roller over which said endless belt extends, wherein said driver roller is translatable to alleviate diagonal stresses on said endless elongated belt and wherein said drive roller is translatable axially by means of a pivoting link, one end of which is connected to a journal for said drive roller.

2. The flexible draper belt assembly as claimed in claim 1, wherein said drive roller translates in an axial direction.

3. The flexible draper belt assembly as claimed in claim 2, wherein said idler roller is pivotable about an axis generally at right angles to the longitudinal plane of said endless elongated belt.

4. The flexible draper belt assembly as claimed in claim 1 having at least a pair of belts and cooperating drive and idler rollers.

5. The flexible draper belt assembly as claimed in claim 1, having two pairs of endless elongated belts, wherein the drive roller for each said belt is adjacent the ends of the belts and said drive rollers are translatable in unison.

6. The flexible draper belt assembly as claimed in claim 5, further comprising a device to rotate said drive belts in synchronism.

7. The flexible draper belt assembly as claimed in claim 6, wherein said assembly further comprises a gearbox housing driving said adjacent drive rollers with a common rotary input.

8. The flexible draper belt assembly as claimed in claim 7, wherein said rotary input is a hydraulic drive.

9. A flexible draper belt assembly for an agricultural harvesting machine movable in a given direction, said assembly comprising:
   at least one endless elongated belt positioned generally laterally with respect to the direction of movement of said agricultural machine;
   an idler roller and a drive roller over which said endless belt extends, wherein said driver roller is translatable along its axis in an axial direction to alleviate diagonal stresses on said endless elongated belt and wherein said drive roller is translatable by means of a pivoting link, one end of which is connected to a journal for said drive roller and the other of which is connected to a frame.

* * * * *